United States Patent
Kunihiro et al.

(10) Patent No.: US 10,752,234 B2
(45) Date of Patent: Aug. 25, 2020

(54) VEHICLE CONTROL DEVICE

(71) Applicant: TOYOTA JIDOSHA KABUSHIKI KAISHA, Toyota-shi, Aichi (JP)

(72) Inventors: Yoji Kunihiro, Susono (JP); Hiroki Asada, Obu (JP); Yoshio Kudo, Machida (JP); Takahiro Yokota, Susono (JP); Masateru Amano, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 222 days.

(21) Appl. No.: 15/901,440

(22) Filed: Feb. 21, 2018

(65) Prior Publication Data
US 2018/0339693 A1    Nov. 29, 2018

(30) Foreign Application Priority Data

May 25, 2017    (JP) .................................. 2017-103366

(51) Int. Cl.
*B60W 10/06*    (2006.01)
*B60W 10/20*    (2006.01)
(Continued)

(52) U.S. Cl.
CPC ............ *B60W 10/06* (2013.01); *B60W 10/20* (2013.01); *B60W 30/12* (2013.01); *B62D 15/025* (2013.01);
(Continued)

(58) Field of Classification Search
CPC ...... B60W 10/06; B60W 30/12; B60W 10/20; B60W 30/18018; B60W 10/08;
(Continued)

(56) References Cited

U.S. PATENT DOCUMENTS 8,788,178 B2 * 7/2014 Pebley .................. F02N 11/084
701/101
2015/0259008 A1 * 9/2015 Seguchi ............... B62D 15/025
701/41
(Continued)

FOREIGN PATENT DOCUMENTS

JP    2011-126535 A *  6/2011
JP    2014-156242 A *  8/2014    ......... Y02T 10/6221
(Continued)

OTHER PUBLICATIONS

Masato Abe; "Motion and Control of Automobile"; Sankaido Co. Ltd.;1992.
(Continued)

*Primary Examiner* — Brian P Sweeney
(74) *Attorney, Agent, or Firm* — Oliff PLC

(57) ABSTRACT

A SS control device is configured to: be allowed to stop an internal combustion engine when a required voltage is smaller than or equal to a first voltage value under a state where a stopping condition is satisfied, and be prohibited from stopping the internal combustion engine when the required voltage is larger than the first voltage value under a state where the stopping condition is satisfied; and be allowed to restart the internal combustion engine when the required voltage is smaller than or equal to a second voltage value smaller than the first voltage value under a state where the restart condition is satisfied, and be prohibited from restarting the internal combustion engine when the required voltage is larger than the second voltage value under a state where the restart condition is satisfied.

5 Claims, 8 Drawing Sheets

(51) Int. Cl.
  *B60W 30/12* (2020.01)
  *B62D 15/02* (2006.01)
  *F02D 17/04* (2006.01)
  *F02D 29/02* (2006.01)
  *F02N 11/08* (2006.01)
  *F02D 41/06* (2006.01)
  *F02D 41/04* (2006.01)

(52) U.S. Cl.
  CPC ......... *B62D 15/0265* (2013.01); *F02D 17/04* (2013.01); *F02D 29/02* (2013.01); *F02D 41/042* (2013.01); *F02D 41/065* (2013.01); *F02N 11/084* (2013.01); *F02N 11/0822* (2013.01); *F02N 11/0829* (2013.01); *F02D 2200/702* (2013.01); *F02N 2200/0801* (2013.01); *F02N 2200/0808* (2013.01); *F02N 2200/104* (2013.01)

(58) Field of Classification Search
  CPC ...... F02D 41/042; F02D 41/065; F02D 29/02; F02D 17/04; F02D 2200/702; B62D 15/0265; B62D 15/025; F02N 11/0829; F02N 11/084; F02N 11/0822; F02N 2200/0808; F02N 2200/0801; F02N 2200/104

USPC ......................................................... 701/41
See application file for complete search history.

(56) References Cited

U.S. PATENT DOCUMENTS

2016/0200351 A1* 7/2016 Malone ................. B62D 5/008
  701/41
2016/0244056 A1   8/2016 Seguchi
2019/0092382 A1* 3/2019 Kogure ............... B62D 5/0484

FOREIGN PATENT DOCUMENTS

| JP | 2015-093522 A | 5/2015 | | |
|---|---|---|---|---|
| WO | 2015/087613 A1 | 6/2015 | | |
| WO | WO 2015/087613 | * | 6/2015 | ............. F02D 29/02 |

OTHER PUBLICATIONS

Sep. 24, 2019 Office Action issued in Japanese Patent Application No. 2017-103366.

* cited by examiner

VEHICLE CONTROL DEVICE

BACKGROUND OF THE INVENTION

1. Field of the Invention

The present invention relates to a vehicle control device for controlling a vehicle which is equipped with an electric power steering apparatus and can exert start-and-stop control.

2. Description of the Related Art

A vehicle disclosed in Japanese Patent Application Laid-open No 2015-93522 is provided with an electric power steering apparatus. As is well known, the power steering apparatus is connected to a steering wheel. Furthermore, the power steering apparatuses provided with an electric steering motor. When electricity of a battery mounted on the vehicle is supplied to the steering motor, an output shaft of the steering motor rotates. The output shaft of the steering motor is connected to steered wheels of the vehicle via a power transmission mechanism. Therefore, when electricity is supplied to the steering motor, steered angles of the steered wheels and a steering angle of a steering wheel of the vehicle change.

A control device mounted on this vehicle can operate an internal combustion engine under a start-and-stop control (hereinafter referred to as SS control).

In Japanese Patent Application Laid-open No. 2013-93522, the SS control is exerted when a predetermined condition is satisfied. That is, when a predetermined stopping condition is satisfied while the internal combustion engine is in an operation state, the control device stops the operation of the internal combustion engine. Specifically, for example, when any one of a steering torque, a steering angle, and a steering angular velocity of the steering wheel is equal to or less than a stopping threshold representing the stopping condition under a state where the vehicle speed is equal to or less than a predetermined speed, the control device stops the operation of the internal combustion engine. Further, when a predetermined restart condition is satisfied under a state where the internal combustion engine is in an operation stopped state, the control device restarts the internal combustion engine. Specifically, for example, when any one of the steering torque, the steering angle, add the steering angular velocity exceeds a restart threshold representing the restart condition under a state where the operation amount of an accelerator pedal is greater than zero, the control device restarts the internal combustion engine.

Further, the control device can exert LKA (Lane Keeping Assist) control for automatically changing the steered angles of the steered wheels of the vehicle so that the vehicle travels along a travel lane on which the vehicle is traveling.

That is, for example, when a camera mounted on the vehicle takes a picture of a lane (a white line) drawn on the travel lane on which the vehicle is traveling, the control device calculates a targeted vehicular swept path which is a vehicular swept path to have the vehicle travel along the travel lane based on the imaged data (captured data). Further, the control device controls the electric power steering apparatus so that the vehicle travels along the targeted vehicular swept path. That is, the control device supplies electricity of the battery lo the steering motor. Then, the steering angle of the steering wheel (the steered angles of the steered wheels) is changed by the electric power steering apparatus, and thus the vehicle travels along the targeted vehicular swept path.

Further, in this vehicle, the stepping threshold and the restart threshold are set as variable values. That is, when the control device exerts the LKA control, the stopping threshold becomes larger than when the LKA control is not exerted. In addition, when the control device exerts the LKA control, the restart threshold becomes larger than when the LKA control is not exerted.

Therefore, when the control device exerts the LKA control, the internal combustion engine is easier to be stopped under the SS control as compared with the case where the LKA control is not exerted. In addition, when the LKA control is exerted, the internal combustion engine is harder to be restarted under the SS control as compared with the case where the LKA control is not exerted.

SUMMARY OF THE INVENTION

As is well known, when the internal combustion engine is operated, an alternator, which is operated in conjunction with the rotation of the internal combustion engine, generates electricity, and the generated electricity is stored (charged) in the battery. Meanwhile, when the internal combustion engine is stopped, the alternator does not generate electricity. Therefore, when the internal combustion engine is stopped, the battery voltage tends to be less than when the internal combustion engine is operated.

When the internal combustion engine which is in the operation stopped state is restarted, a starter motor rotates using electricity supplied from the battery. Thus, when the internal combustion engine is restarted, the battery voltage tends to be further less than when the internal combustion engine is in the operation stopped state.

Therefore, when the control device supplies the electricity of the battery to the steering motor of the electric power steering apparatus while the internal combustion engine is stopped, there is a possibility that the steering motor cannot generate an output having a desired value. Further, when the control device supplies the electricity of the battery to the steering motor while the internal combustion engine is executing restart operation, there is a possibility that the steering motor cannot generate an output having a desired value.

Therefore, for example, when the control device stops or restarts the internal combustion engine under SS control while exerting the LKA control, there is a possibility that the steering angle of the steering handle, which is changed by the steering motor, may temporarily become smaller than a desired steering angle.

The present invention has been made to cope with the above problems, and has an object to provide a vehicle control device capable of reducing a possibility that an electric steering motor of an electric power steering apparatus fails to generate a desired output due to SS control over an internal combustion engine.

In order to achieve the object, the SS control device of the present invention comprises:

an internal combustion (11) engine installed in a vehicle;

a power generating means (13) for generating electricity using power of the internal combustion engine;

a battery (14) for storing the electricity generated by the power generating means;

an electric starter motor (12) that rotates to start the internal combustion engine when being supplied the electricity from the battery;

an electric power steering apparatus (25) having, an electric steering motor (36) that rotates to change steered angles of steered wheels (15FL, 15FR) of the vehicle when being supplied the electricity from the battery;

a steering motor control device (50, 55) for calculating a required voltage (Vr) that is a voltage required for rotating the steering motor so as to generate a predetermined output, the steering motor control device applying a voltage to the steering motor using the electricity of the battery; and a SS control device (50, 51) for exerting a SS control in which the operation of the internal combustion engine that is in an operation state is stopped when a predetermined stopping condition is satisfied and the starter motor is rotated to restart the internal combustion engine that is in an operation stopped state when a predetermined restart condition is satisfied.

The SS control device is configured to:

be allowed to stop the internal combustion engine when the required voltage is smaller than or equal to a first voltage value (Vmins) under a state where the stopping condition is satisfied, and be prohibited from stopping the internal combustion engine when the required voltage is larger than the first voltage value under the state where the stopping condition is satisfied; and be allowed to restart the internal combustion engine when the required voltage is smaller than or equal to a second voltage value (Vminrs) smaller than the first voltage value under a state where the restart condition is satisfied, and be prohibited from restarting the internal combustion engine when the required voltage is larger than the second voltage value under the state where the restart condition is satisfied.

The SS control device of the present invention is allowed to stop the internal combustion engine when the required voltage is smaller than or equal to the first voltage value under the state where the stopping condition is satisfied, and is prohibited from stopping the internal combustion engine when the required voltage is larger than the first voltage value under the state where the stopping condition is satisfied. Further, the SS control device is allowed to restart the internal combustion engine when the required voltage is smaller than or equal to the second voltage value smaller than the first voltage value under the state where the restart condition is satisfied, and is prohibited from restarting the internal combustion engine when the required voltage is larger than the second voltage value under the state where the restart condition is satisfied.

Therefore, even when a stopping operation of the internal combustion engine under the SS control and a steering operation of the steered wheels by the electric power steering apparatus are executed simultaneously, the steering motor does not fail to generate a desired output. Similarly, even when a restart operation of the internal combustion engine under the SS control and the steering operation of the steered wheels by the electric power steering apparatus are executed simultaneously, the steering motor does not fail to generate a desired output. Thus, the steered angles of the steered wheels which are changed by the steering motor do not become smaller than desired angles, and a driver of the vehicle does not feel discomfort when the internal combustion engine is operated under the SS control.

In one aspect of the present invention, the vehicle control device further comprises targeted vehicular swept path calculating means (50, 55) for calculating, a targeted vehicular swept path that is a vehicular swept path of the vehicle when a predetermined period of time (Trs) passes.

The steering motor control device is configured to calculate the required voltage when the predetermined period of time passes so that the vehicle travels along the targeted vehicular swept path.

In one aspect of the present invention, the steering motor control device calculates the required voltage the predetermined period of time later so that the vehicle travels along the targeted vehicular swept path calculated fey the targeted vehicular swept path calculating means. Thus, even when the driver of the vehicle does not operate a steering wheel, the vehicle travels along the targeted vehicular swept path.

In this case, since there is a fear that the attention of the driver to the steering wheel may be reduced when the vehicle is traveling, the driver is likely to feel discomfort significantly when the steering motor does not generate a desired output.

However, since the steering motor does not fail to generate the desired output, even if the attention of the driver to the steering wheel is reduced while the vehicle is traveling, the driver does not feel discomfort significantly.

In one aspect of the present inversion, the steering motor control device is configured to be capable of calculating a complete explosion time required voltage that is the required voltage at a complete explosion completion time. The complete explosion completion time is a time at which a complete explosion is expected to be completed in the internal combustion engine in a case where the starter motor is started at a predetermined time. The complete explosion completion time is a time at which a predetermined required time for starting (Trs) passes since the predetermined time.

The SS control device is configured to start the starter motor at the predetermined time when the complete explosion time required voltage is smaller than or equal to the second voltage value.

When the internal combustion engine is restarted, it is necessary to operate the starter motor to make an initial explosion be carried out in the internal combustion engine and to keep operating the starter motor until a complete explosion is earned out in the internal combustion engine.

Therefore, if the SS control device is configured so that the SS control device is allowed to start the starter motor at the complete explosion completion time in the case where the complete explosion time required voltage is less than or equal to the second voltage value, the starter motor rotates immediately after the complete explosion completion time. Thus, the required voltage may become larger than the second voltage value immediately after the complete explosion completion time. In other words, the steering motor may fail to generate the desired output immediately after the complete explosion completion time.

However, when the present invention is executed in this aspect manner, the starter motor does not rotate after the complete explosion completion time. Therefore, there is less possibility that the required voltage becomes larger than the second voltage value immediately after the complete explosion completion time.

In one aspect of the present invention, the steering motor control device is configured to calculate the required voltage when a predetermined electricity suppression condition is satisfied so that the required voltage when the predetermined electricity suppression condition is satisfied is smaller than the required voltage which is calculated when the predetermined electricity suppression condition is not satisfied.

In one aspect of the present invention, when the electricity suppression condition is satisfied, the required voltage becomes smaller as compared with the case where the electricity suppression condition is not satisfied. Therefore, when the electricity suppression condition is satisfied, the electric power steering apparatus can be operated with smaller voltage.

In the above description, references used in the following descriptions regarding embodiments are added with parentheses to the elements of the present invention, in order to understand the invention. However, those references should not be used to limit the scope of the present invention.

Other objects, other features, and accompanying advantages of the present invention are easily understood from the description of embodiments of the present invention to be given referring to the following drawings.

DETAILED DESCRIPTION OF THE PREFERRED EMBODIMENTS

Figure 1:
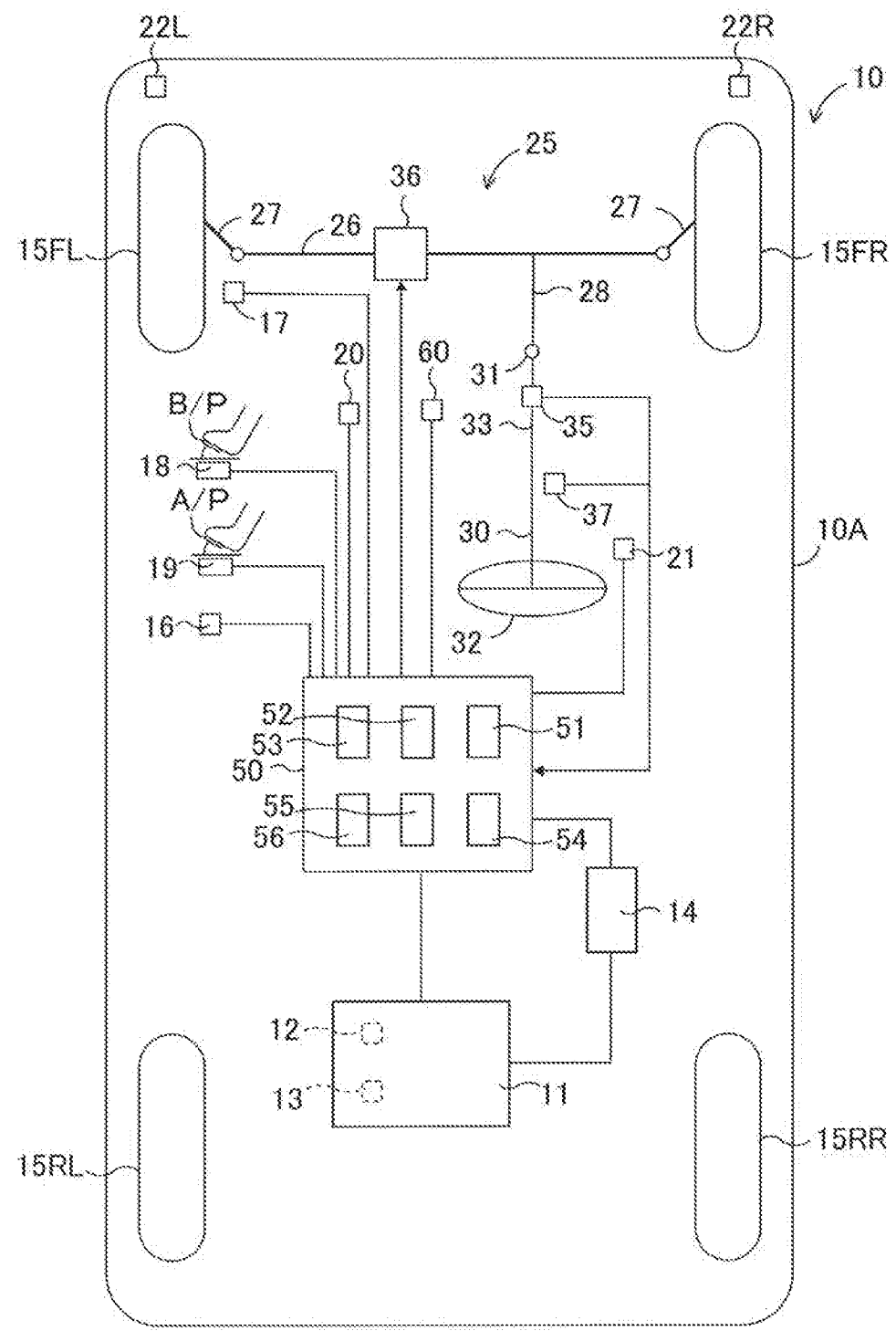
FIG. 1 is a schematic plan view of an entire vehicle including a vehicle control device according to an embodiment of the present invention.

Hereinafter, a vehicle 10 according to an embodiment of the present invention will be described with reference to the FIGS. 1 to 9.

First, the overall structure of the vehicle 10 will be described with reference to FIG. 1.

The vehicle 10 is provided with a control device 50. The control device 50 includes an engine control ECU 51, a vehicle control ECU 52, a brake control ECU 53, a camera control ECU 54, a steering control ECU 55, and a required voltage monitoring ECU 56. ECU is an abbreviation of Electric Control Unit and is provided with a microcomputer including a storage device such as a CPU, a ROM, and a RAM. The CPU realizes various functions by executing instructions (programs) stored in the ROM. Further, the engine control ECU 61, the vehicle control ECU 52, the brake control ECU 53, the camera control ECU 54, the steering control ECU 55, and the required voltage monitoring ECU 56 are connected with each other so as to be capable of mutually transmitting and receiving various control information and request signals via a CAN (Controller Area Network).

The vehicle 10 is provided with an internal combustion engine 11 (hereinafter referred to as an engine 11). The engine 11 burns an air-fuel mixture of air and fuel (for example, gasoline) injected from an injector (not shown) in a combustion chamber of a cylinder. When a piston in the cylinder moves up and down along with the combustion, a crankshaft (not shown) is rotated, and the engine 11 is put into an operation state.

The engine 11 is provided with a starter motor 12 and an alternator 13.

As is well known, in order to start the engine 11, an ignition (not shown) of the vehicle 10 is switched from OFF to ON by operating an ignition key (not shown). Then, the electricity (electric power) of a battery 14 is supplied to the starter motor 12 and the starter motor 12 is started. Then, an initial explosion is carried out in the engine 11 and the crankshaft is rotated. When the number of rotations of the crankshaft becomes more than or equal to a predetermined number, the engine control ECU 51 determines that a complete explosion is carried out (completed) in the engine 11 and stops the starter motor 12.

The period of time from the start of the starter motor 12 until the complete explosion of the engine 11 is not constant. However, the engine 11 is designed so that the complete explosion is carried out (completed) until a predetermined required time for starting Trs passes since the start of the starter motor 12 as long as there is no failure. The required time for starting Trs is recorded in a storage device of the engine control ECU 51. It should be noted that the required time for starting Trs is, for example, 5 seconds.

Further, when the engine 11 is in the operation state, the rotational force of the crankshaft is transmitted to the alternator 13 via a belt (not shown). Then, the alternator 13 generates electricity. The electricity generated by the alternator 13 is stored in the battery 14.

The electricity stored in the battery 14 is supplied to the control device 50. The voltage of the electricity stored in the battery 14 is constantly detected (monitored) by the required voltage monitoring ECU 56. Further, the control device 50 controls the battery 14 so that the electricity of the battery 14 is supplied to various electronic devices of the vehicle 10. These electronic devices includes a brake actuator, a special motion state quantity sensor (which is different from sensors 16, 17, 18 described later), an air conditioner, a liquid crystal panel and a motor for driving the slide window, all of which are not shown, in addition to a yaw rale sensor 16, a wheel speed sensor 17, a brake operation amount sensor 18, a camera 20, direction indicators 22L and 22R, a steering torque sensor 35, a steering motor 36, and a steering angle sensor 37.

An accelerator operation amount sensor 19 is connected to the engine control ECU 51. The accelerator operation amount sensor 19 detects an operation amount AP of the accelerator pedal A/P, and outputs a signal representing the operation amount AP to the engine control ECU 51. Further, a throttle actuator (not shown) of the engine 11 is connected to the engine control ECU 51. The engine control ECU 51 controls the throttle actuator in accordance with a signal representing the received operation amount AP. The throttle actuator changes an opening degree of a throttle valve by driving the throttle valve provided in the intake duct of the engine 11. That is, the opening degree of the throttle valve changes in accordance with the operation amount AP. When the opening degree of the throttle valve changes, the amount of air taken into the engine 11 changes to change the amount of fuel injected into the engine 11. As a result, the torque of the engine 11 changes.

A suspension (not shown) is provided in the front portion of a vehicle body 10A of the vehicle 10. Each of carriers (knuckle arms) is supported between each of the distal ends of left and right upper arms and each of the distal ends of left and right lower arms so as to be rotatable about a corresponding kingpin axis. The carriers, the upper arms and the lower arms are components of the suspension. Further, the left and right carriers support a pair of left and right front wheels 15FL, 15FR respectively so as to be rotatable about a corresponding horizontal axis.

A pair of left and right rear wheels 15RL and 15RR are supported at the rear portion of the vehicle 10 so as to be rotatable about a horizontal axis.

The yaw rate sensor 18 for detecting yaw rate of the vehicle 10 is provided in the vehicle body 10A. The yaw rate sensor 18 is operated using electricity supplied from the battery 14.

Further, the wheel speed sensors 17 (only one wheel speed sensor 17 is shown in FIG. 1), each of which corresponds to each wheel, are provided at four portions of the vehicle body 10A. Each of the wheel speed sensors 17 is operated by using electricity supplied from the battery 14.

The yaw rate sensor 16 and the wheel speed sensors 17 are connected to the vehicle control ECU 52. The vehicle control ECU 52 receives the detection signal of the yaw rate sensor 16 and the detection signals of the wheel speed sensors 17.

The vehicle control ECU 52 acquires the vehicle speed V of the vehicle 10 based on the detection value of each wheel speed sensor 17.

The vehicle 10 is provided with a brake pedal B/P and the brake operation amount sensor 18. The brake operation amount sensor 18 is operated by using electricity supplied from the battery 14.

The brake operation amount sensor 18 defects an operation amount BP of the brake pedal B/P, and outputs a signal representing the operation amount BP to the brake control ECU 53.

Further, a brake actuator (not shown) is connected to the brake control ECU 53. The brake actuator is provided in a hydraulic circuit between a master cylinder that pressurizes the hydraulic fluid by using a depressing force of the brake pedal B/P and a friction brake mechanism provided in each wheel. The friction brake mechanism presses a brake pad of each wheel against corresponding brake disc to generate hydraulic braking force by actuating a wheel cylinder using hydraulic pressure of the hydraulic fluid supplied from the brake actuator. The brake actuator is a well-known actuator for adjusting the pressure of the hydraulic fluid supplied to the wheel cylinders, and supplies the hydraulic pressure corresponding to a command from the brake control ECU 53 to each of the wheel cylinders to generate braking forces on each of the wheels.

The brake actuator includes an electric pump and a plurality of solenoid valves, and is operated by using electricity supplied from the battery 14.

The brake control ECU 53 operates the brake actuator based on the brake operation amount BP detected by the brake operation amount sensor 18 and an operation state amount detected by the special motion state quantity sensor(s) (not shown) of the vehicle 10. When the brake actuator is operated, a braking force is applied to each wheel, so that the vehicle 10 is decelerated.

The vehicle 10 is provided with the camera 20 controlled by the camera control ECU 54. The camera 20 is operated using electricity supplied from the battery 14. The camera 20 is provided inside the vehicle 10 so as to fee positioned immediately behind a front window (not shown). The camera 20 is a stereo camera. The camera 20 images (takes a picture of) an object (for example, a vehicle and a pedestrian) positioned in front of the front window.

The imaged data (the captured data) of the camera 20 is transmitted to the camera control ECU 54. The camera control ECU 54 specifies the type of the object(s) in the imaged data by using pattern matching in which the imaged data imaged by the camera 20 is used.

Further, the camera 20 images left and right white lines (lane markers) on a road on which the vehicle 10 is traveling. Further, the camera control ECU 54 calculates the shape of the road and the positional relationship between the road and the vehicle 10 based on the imaged white lines.

The vehicle 10 is provided with an electric power steering apparatus 25.

The electric power steering apparatus 25 is provided with a rack shaft 26 which is a bar-like member extending in the lateral direction (the left and right direction). The rack shaft 26 is slidable in the lateral direction with respect to the vehicle body 10A and is not rotatable about its own axis. A screw groove is formed on the outer peripheral surface of the rack shaft 26.

Inner end portion of each of a pair of left and right tie rods 27 is connected to corresponding one of the left and right end portions of the rack shaft 26, and outer end portion of each of the left and right tie rods 27 is connected to corresponding one of the left and right carriers.

A pinion shaft 28 is meshed with the rack shaft 26 (screw groove).

One end (the lower end) of a steering shaft 30, which is a bar-like member, is connected to the pinion shaft 28 via a universal joint 31.

Further, a steering handle 32 is fixed to the other end (the upper end) of the steering shaft 30.

Accordingly, when the steering wheel 32 is rotated, this rotational force is transmitted to the pinion shaft 20 via the steering shaft 30 and the universal joint 31, and then the pinion shaft 28 is rotated about its own axis. Then, since the rack shaft 26 meshing with the pinion shaft 28 slides in one of the lateral direction, the steered angles of the front wheels 15FL, 15FR linked with the rack shaft 26 via the tie rods 27 and the carriers change.

The intermediate portion of the steering shaft 30 is constituted by a torsion bar 33. The steering torque sensor 35 for detecting a steering torque Tr of the steering shaft 30 based on a torsion angle of the torsion bar 33 about its own axis is provided near the torsion bar 33. The steering torque sensor 35 can be constituted by, for example, a resolver.

Therefore, when the steering shaft 30 is rotated, the steering torque sensor 35 detects the steering torque Tr of the steering shaft 30.

In addition, the electric power steering apparatus 25 is provided with the steering motor 36 which is an electric DC motor (direct current motor). The steering meter 36 is linked to the rack shaft 26 (screw groove) via a speed reduction mechanism (not shown).

Further, the steering angle sensor 37 for detecting a steering angle MA, which is a rotation angle of the steering shaft 30 (the steering wheel 32), is provided around the steering shaft 30.

The steering torque sensor 35, the steering motor 36, and the steering angle sensor 37 are connected to the steering control ECU 55.

When the steering handle 32 is steered by a driver of the vehicle 10, the steering control ECU 55 calculates a target steering assist torque by applying the steering torque Tr detected by the steering torque sensor 35 and the vehicle speed V calculated by the vehicle control ECU 52 to a target steering assist torque calculation map (look-up table) recorded in the storage device of the steering control ECU 55. Further, the steering control ECU 55 controls the steering motor 36 so that the output shaft of the steering motor 36 outputs the target steering assist torque. As a result, the torque generated by the steering motor 36 is transmitted to the rack shaft 26, so that a steering assist is executed when the steering wheel 32 is steered by the driver.

Further, the vehicle 10 is provided with a steering wheel support portion (not shown) that rotatably supports the steering handle 32. A direction indicator operating lever 21 is supported on the side surface of the steering wheel supporting portion so as to be rotatable in a vertical direction (up and down direction). Further, a pair of left and right direction indicators 22L, 22R are provided on the front surface of the vehicle 10.

The direction indicator operating lever 21 and the direction indicators 22L, 22R are connected to the vehicle control ECU 52.

When the direction indicator operating lever 21 is rotated upward from an initial position thereof, the vehicle control ECU 52 supplies the electricity of the battery 14 to the left direction indicator 22L to blink a lighting equipment of the direction indicator 22L. On the other band, when the direction indicator operating lever 21 is rotated downward from the initial position, the vehicle control ECU 52 supplies the electricity of the battery 14 to the right direction indicator 22R to blink a lighting equipment of the direction indicator 22R.

The engine control ECU 51 according to the present embodiment is capable of operating the engine 11 under SS control.

That is, when a predetermined stopping condition is satisfied while the engine 11 is in the operation state, the engine control ECU 51 stops the supply of fuel to the engine 11 to temporarily stop the engine 11. For example, when a state in which the vehicle speed V of the vehicle 10 is equal to or less than a predetermined speed (for example, equal to or less than 10 km/h) and the operation amount AP of the accelerator pedal A/P is zero is maintained for a predetermined period of time, the stopping condition is satisfied.

Further, when a predetermined restart condition is satisfied under the temporarily stopped state, the engine control ECU 51 starts the starter motor 12 to restart the engine 11. For example, when a state in which the operation amount AP of the accelerator pedal A/P is larger than zero is maintained for a predetermined period of time, the restart condition is satisfied.

In this manner, the engine control ECU 51 exerts the SS control when the vehicle 10 is stopped and when the vehicle 10 is traveling.

Further, the control device 50 can exert an automatic driving support control and a collision avoidance control.

The automatic driving support control and the collision avoidance control are executed when an automatic driving support mode is selected by operating an automatic driving support mode selection switch 60 provided in the interior of the vehicle 10 (for example, an instrumental panel). The automatic driving support mode selection switch 60 is connected to the control device 50.

First, the automatic driving support control will be described.

Figure 2:
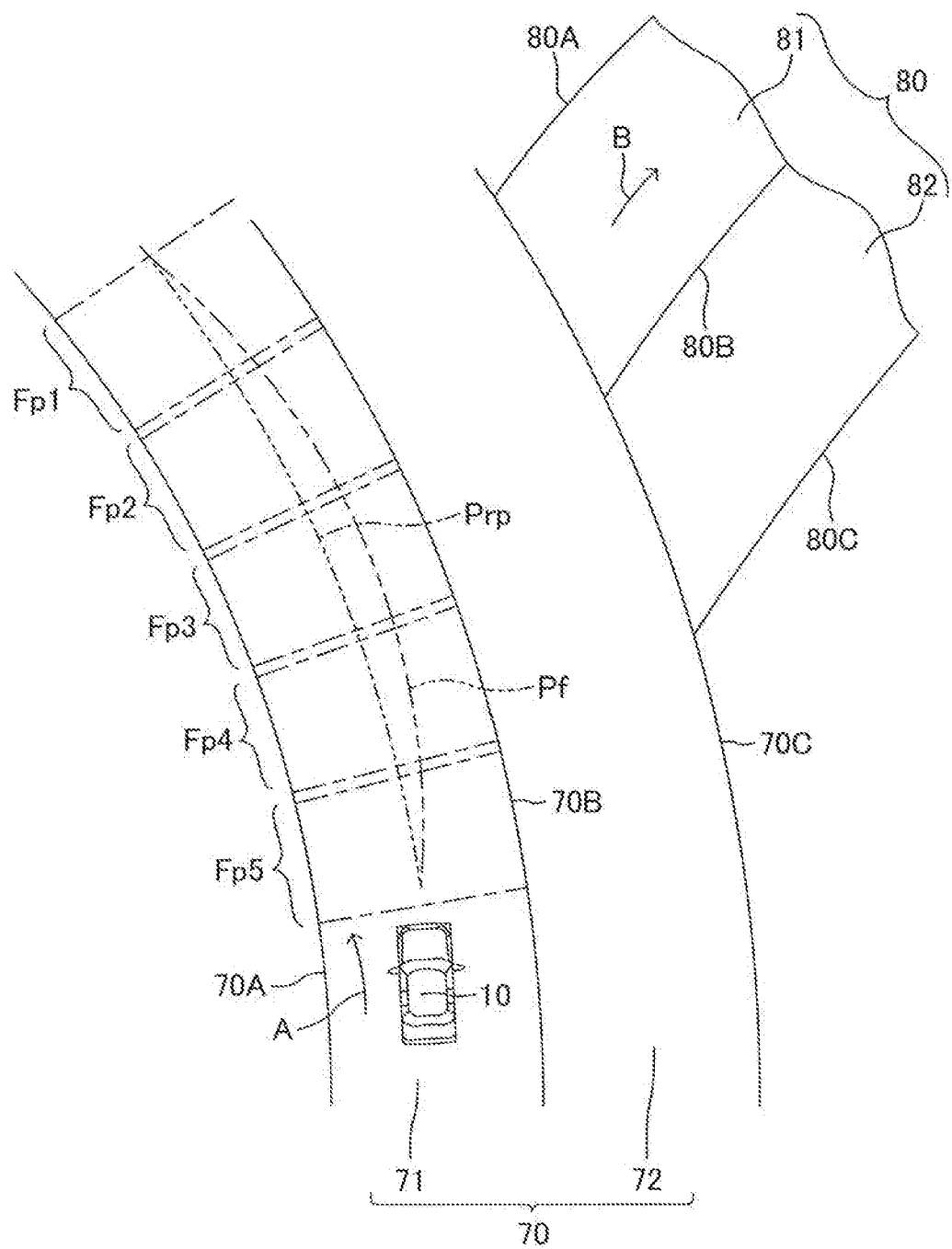
FIG. 2 is a plan view showing a state in which the vehicle travels on a road.

FIG. 2 shows a state, in which the vehicle 10 in the automatic driving support mode is traveling on a road 70. White lines 70A, 70B, 70C (lane markers) are drawn on both side edge portions of the road 70 and on the center portion of the road 70 in the width direction, respectively. The white line 70B is a central separation line (a median). That is, the road 70 has two travel lanes 71, 72. The vehicle 10 travels on the travel lane 71 in the direction of an arrow A. On the other hand, a vehicle (not shown) different from the vehicle 10 travels on the travel lane 72 in the direction opposite to the arrow A.

A road 80 different from the road 70 is connected to the travel lane 72 of the road 70. White lines 80A, 80B, 80C (lane markers) are drawn on both side edge portions of the road 80 and on the center portion of the road 80 in the width direction, respectively. The white line 80B is a central separation line (a median). That is, the road 80 has two travel fanes 81, 82. The vehicle 10 may travel on the travel lane 81 in the direction of an arrow B. On the other hand, a vehicle (not shown) different from the vehicle 10 travels on the travel lane 82 in the direction opposite to the arrow B.

The steering control ECU 55 receives imaged data which was imaged by the camera 20 from the camera Control ECU 54. This imaged data includes imaged data of the white line 70A and imaged data of the white line 70B. The steering control ECU 55 calculates a targeted vehicular swept path Prp of a front portion Fp which is a portion of the road 70 based on the imaged data of the white line 70A and the imaged data of the white line 70B. For example, the steering control ECU 55 calculates a path that passes through the center position of the travel lane 71 (i.e., the center position of the area between the left white line 70A and the right white line 70B) in the width direction as the targeted vehicular swept path Prp.

Five front portions Fp are showed in FIG. 2. That the front portions Fp include the front portions Fp1, Fp2, Fp3, Fp4, Fp5. Each front portion Fp is a portion of the road 70 on which the vehicle 10 travels when a required time for starting Trs passes from a predetermined time. That is, each front portion Fp is separated forward from a current position of the vehicle 10 by a forward separation distance: Lpf which is a value obtained by multiplying the vehicle speed V of the vehicle 10 at the predetermined time by the required time for starting Trs.

The front end of each front portion Fp corresponds to the front end position of the vehicle 10 the required time for starting Trs later. Similarly, the rear end of each front portion Fp corresponds to the rear end position of the vehicle 10 the required time for starting Trs later.

The front portion Fp1 is separated forward by the forward separation distance Lpf from the position of the vehicle 10 at the current time.

The front portion Fp2 is separated forward by the forward separation distance Lpf from the position of the vehicle 10 at the time going back a predetermined calculation interval time Tc in time from the current time. The calculation interval time Tc represents calculation interval for calculating the targeted vehicular swept path Prp, a curvature $\rho$, a targeted steering angle $\theta^*$, targeted steering angular velocity $\theta d^*$; a limiting; speed $V^*$, a required torque Trq (a required output Opra), and a required voltage Vr by the steering control ECU 55. The curvature $\rho$, the targeted steering angle $\theta^*$, the targeted steering angular velocity $\theta d^*$, the limiting speed $V^*$. the required torque Trq (the required output Opra) and the required voltage Vr will be described later. The calculation interval time Tc according to the present embodiment is set to ⅕ of the required time for starting Trs.

Similarly, the front portion Fp3 is separated forward, by the forward separation distance Lpf from the position of the vehicle 10 at the time going back a predetermined period of time which is two times larger than the predetermined calculation interval time Tc in time from the current time.

Similarly, the front portion Fp5 is separated forward by the forward separation distance Lpf from the position of the vehicle 10 at the time going back a predetermined period of time which is three times larger than the predetermined calculation interval time Tc in time from the current time. Similarly, the front portion Fp5 is separated forward by the forward separation distance Lpf from the position of the vehicle 10 at the time going back a predetermined period of time which is four times larger than the predetermined calculation interval time Tc in time from the current time.

Further, the steering control ECU 55 calculates the curvature ρ of the front portion Fp based on the targeted vehicular swept path Prp.

Further, the steering control ECU 55 calculates the targeted steering angle θ* corresponding to the front portion Fp based on the calculated curvature ρ. In other words, the steering control ECU 55 calculates the targeted steering angle θ* the required time for starting Trs later. That is, the steering control ECU 55 calculates the targeted steering angle θ* the required time for starting Trs later for positioning the vehicle 10 on the targeted vehicular swept path Prp of the front portion Fp the required time for starting Trs later based oh the curvature ρ corresponding to the front portion Fp.

Further, the steering control ECU 55 calculates the targeted steering angular velocity θd* the required time for starting Trs later by differentiating the targeted steering angle θ* with respect to time.

Further, the steering control ECU 55 calculates the limiting speed V* which is a limit value (upper limit value) of the vehicle speed V and corresponds to the front portion Fp based on the targeted steering angle θ* the required time for starting Trs later and the limit value of the lateral acceleration the required time for starting Trs later. In other words, the steering control ECU 55 calculates the limiting speed V* the required time for starting Trs later.

Further, the steering control ECU 55 calculates the required torque Trq (output torque) which is a torque to be outputted by the steering motor 36 the required time for starting Trs later based on the targeted steering angle θ* the required time for starting Trs later and the limiting speed V* the required time for starting Trs later.

For example, the required torque Trq (restoring moment) can be calculated by applying the targeted steering angle θ* (steering angle) and the limiting speed V* (vehicle speed) to the following expression (1).

$$Trq = f(θ*, V*) = 2ζKf(β + If×γ/V* − θ*)$$ equation (1)

ζ: trail [m]
Kf: cornering power front [N/rad]
β: vehicle foody slip angle [rad]
If: front-to-rear distance between the front wheel axle and the center of gravity of the vehicle
γ: yaw rate [rad/s]

It should be noted that, a procedure for calculating the required torque Trq of the steering motor 36 based on the targeted steering angle θ* (steering angle) and the limiting speed V* (vehicle speed) is well known, and is described in. for example, "Motion and Control of Automobile (publishing house: Sankaido Co. Ltd., author: Masato Abe, publication day of the first edition: Jul. 10, 1992)".

Further, the steering control ECU 55 multiplies the required torque Trq the required time for starting Trs later toy the target steering angular speed θd* the required time for starting Trs later to calculate the required output Opra to be outputted by the steering motor 36 the required time for starting Trs later.

Incidentally, a certain relationship among an output torque (required torque Trq) of the steering motor 36 being a DC motor, an applied voltage applied to the steering motor 36, and an angular velocity of the output shaft of the steering motor 36 is satisfied. Furthermore, the angular velocity of the output shaft is proportional to the steering angular velocity (targeted steering angular velocity θd*) of the steering wheel 32. Therefore, the required voltage Vr which is the voltage value to be applied to the steering motor 36 can be calculated based on the required torque Trq of the steering motor 36 and the targeted steering angular velocity θd*. In other words, the required voltage Vr can be calculated based on the required output Opra.

In this embodiment, the required torque Trq of the steering motor 36 and the targeted steering angular velocity θd* of the steering handle 32 are used as arguments (parameters), and a required voltage calculation map (look-up table) which can calculate the required voltage Vr using the two arguments is recorded in the storage device of the steering control ECU 55. Therefore, the steering control ECU 55 applies the required torque Trq the required time for starting Trs later and the target steering angular speed θd* the required time for starting Trs later to this required voltage calculation map to calculate the required voltage Vr the required time for starting Trs later. The required voltage Vr is a voltage value required for the steering control ECU 55 to control the steering motor 36 so that the steering angle of the steering wheel 32 the required time for starting Trs later is made to coincide with the targeted steering angle θ*.

When the automatic driving support mode is selected by the automatic driving support mode selection switch 60, the steering control ECU 55 constantly applies the electricity of the battery 14 to the steering motor 36 while exerting well-known current feedback control (PID control). Then, the electric power steering apparatus 25 is operated by the output of the steering motor 36.

In this case, when the voltage of the battery 14 at the time when the required time for starting Trs passes from the current time is equal to or higher than the required voltage Vr at this time, the steering angle of the steering wheel 32 the required time for starting Trs later is coincident with the targeted steering angle θ*. Therefore, the vehicle 10 will travel along the targeted vehicular swept path Prp the required time for starting Trs later.

Furthermore, the vehicle speed V of the vehicle 10 will be limited to the limiting speed V* or less the required time for starting Trs later.

For example, when the vehicle speed V is greater than the limiting speed V* at the current time, the engine control ECU 51, which has received signal from the steering control ECU 55, controls the throttle actuator to reduce the opening degree of the throttle valve, and/or the brake control ECU 53, which has received signal from the steering control ECU 55, actuates the brake actuator. As a result, when the required time for starting Trs passes from the current time, the vehicle speed V of the vehicle 10 becomes a speed which is equal to or less than the limiting speed V*.

On the other hand, when the vehicle speed V is equal to or less than the limiting speed V* at the current time, the vehicle speed V is not controlled to calculate the required torque Trq. That is, in this case, the engine control ECU 51 does not control the throttle actuator and the brake control ECU 53 does not actuate the brake actuator.

Every time the calculation interval time Tc passes, the steering control ECU 55 repeatedly calculates the targeted vehicular swept path Prp, the curvature ρ, the limiting speed V*, the targeted steering angle θ*, the targeted steering angular velocity θd*, the required output Opra and the required voltage Vr, all of which correspond to each of the front portions Fp. Further, the steering control ECU 55 stores the calculated curvature ρ, the calculated limiting speed V*, the calculated targeted steering angle θ*, the calculated targeted steering angular velocity θd* the calculated required output Opra, and the calculated required voltage Vr in the storage device thereof in a time-series manner.

Figure 3:
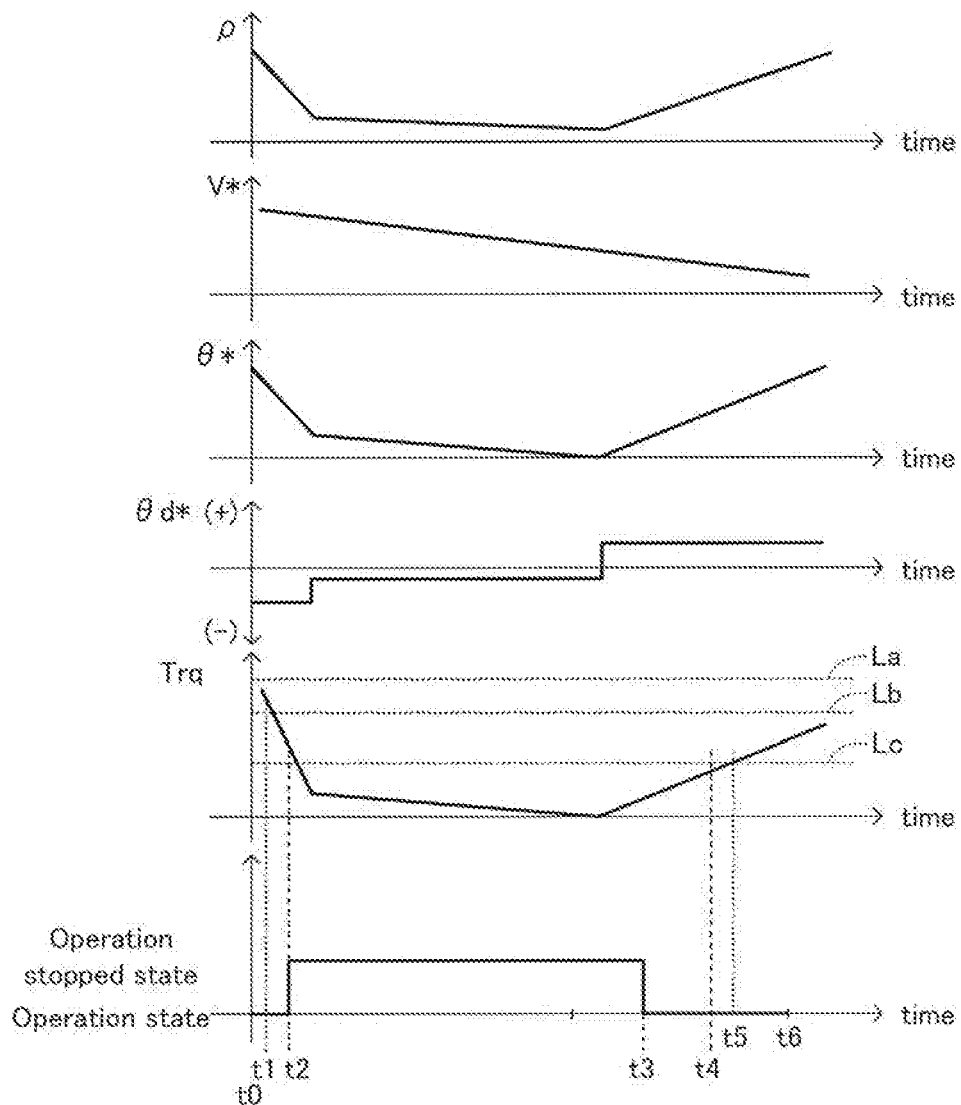
FIG. 3 is a timing chart showing a curvature of the road, a limiting speed of the vehicle, a targeted steering angle, a targeted steering angular velocity, a required torque of a steering motor, and a stale of SS control.

FIG. 3 shows a graph representing an example of a relationship among the curvature ρ, the limiting speed V*, the targeted steering angle θ*, the targeted steering angular velocity θd*, the required torque Trq and time. This graph is made based on the curvature ρ, the limiting speed V*, the targeted steering angle θ*, the targeted steering angular velocity θd*, and the required torque Trq, all of which correspond to each of the front portions Fp. Noted that time t0 is the current time.

As described above, when the engine control ECU 51, the brake control ECU 53, and the steering control ECU 55 exert the automatic driving support control, the vehicle 10 travels on the road 70 along the targeted vehicular swept path Prp even if the driver does not operate the steering wheel 32, the accelerator pedal A/P, and the brake pedal B/P.

Next, the collision avoidance control exerted by the control device 50 will be described.

The collision avoidance control includes a warning control, an automatic brake control, and an automatic steering control.

For example, when the camera 20 captures an image of another vehicle (hereinafter referred to as a preceding vehicle), which is positioned in front of the vehicle 10 and is traveling on the travel lane 71, the vehicle control ECU 52 calculates a collision prediction time TTC which is an predicted period of time until the vehicle 10 collides with the preceding vehicle. Furthermore, when the vehicle control ECU 52 determines that the collision prediction time TTC is equal to or shorter than a first collision prediction time recorded in the storage device thereof, the vehicle control ECU 52 activates a warning device provided in the vehicle 10. That is, the warning control is exerted.

The collision prediction time TTC is calculated by the vehicle control ECU 52 based on the distance L between the preceding vehicle and the vehicle 10 and the relative speed Vr of the vehicle 10 with respect to the preceding vehicle. The relative speed Vr is calculated based on the imaged data captured by the camera 20.

Furthermore, when the vehicle control ECU 52 determines that the collision prediction time TTC is less than or equal to a second collision prediction time recorded in the storage device after the vehicle control ECU 52 activates the warning device, the brake control ECU 53 activates the brake actuator. Therefore, a friction braking force is applied to the front wheels 15FL, 15FR and the rear wheels 15RL, 15RR from the friction brake mechanism to reduce the vehicle speed V. That is, the automatic brake control is exerted.

Further, when the vehicle control ECU 52 determines that the vehicle 10 is likely to collide with the preceding vehicle after the brake control ECU 53 activates the brake actuator, the steering control ECU 55 supplies the electricity of the battery 14 to the steering motor 36. Then, the steering handle 32 is steered by the output of the steering motor 36 so that the vehicle 10 avoids colliding with the preceding vehicle. That is, the automatic steering control is exerted.

Incidentally, the voltage of the battery 14 varies depending on a state of the engine 11 and states of the electronic devices mounted on the vehicle 10.

For example, when the electronic devices are simultaneously operated under a state where the engine 11 is in a normal operation state (that is, a state in which the engine 11 is operated without rotating the starter motor 12), the voltage of the battery 14 becomes approximately 14V. That is, when the engine 11 is in the normal operation state, the minimum value of the voltage of the battery 14 is approximately 14V. Hereinafter, this voltage value (14V) is referred to as "normal operation time minimum voltage Vmind".

Further, when the engine control ECU 51 stops the engine 11 under the SS control, the electricity generation operation of the alternator 13 is stopped. Therefore, when the states of the electronic devices are the same as the case where the engine 11 is in the normal operation state, the voltage of the battery 14 is lower compared with when the engine 11 is in the normal operation state. Therefore, when the electronic devices are operated simultaneously under the state, where the engine 11 is stopped, the voltage of the battery 14 becomes approximately 12V. That is, when the engine 11 is in the operation stopped state, the minimum value of the voltage of the battery 14 is approximately 12V. Hereinafter, this voltage value (12V) is referred to as "stop time minimum voltage Vmins".

Further, when the engine control ECU 51 restarts the engine 11 under the SS control using the starter motor 12, the electricity of the battery 14 is supplied to the starter motor 12. Therefore, when the states of the electronic devices are the same as the case where the engine 11 is in the operation stopped state, the voltage of the battery 14 becomes less than when the engine 11 is in the operation stopped state. Therefore, when the electronic devices are operated simultaneously under the state where the starter motor 12 is rotated, the voltage of the battery 14 becomes approximately 8V. That is, when the engine 11 is restarted, the minimum value of the voltage of the battery 14 is approximately 8V. Hereinafter, this voltage value (8V) is referred to as "restarting time minimum voltage Vminrs".

As described above, the required voltage Vr of the steering motor 36 can be calculated using the required voltage calculation map.

Figure 4:
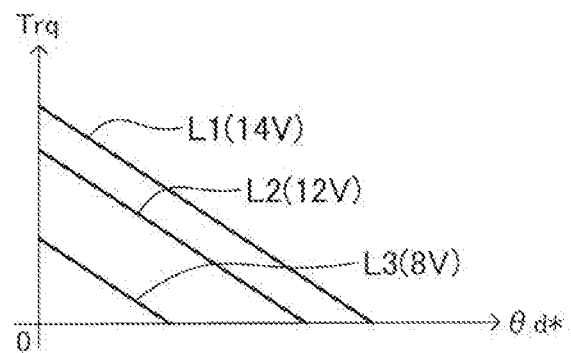
FIG. 4 is a graph showing a relationship among a required voltage of a battery, the required torque of the steering motor, and the targeted steering angular velocity.

FIG. 4 shows the relationship among the required voltage Vr (applied voltage) of the steering motor 36, the required torque Trq of the steering motor 36, and the absolute value of the targeted steering angular velocity θd* (steering angular velocity) of the steering handle 32. This relationship is determined by the required voltage calculation map. In other words, FIG. 4 shows the relationship between the required voltage Vr and the required output Opra of the steering motor 36.

When the required output Opra determined by the required torque Trq of the steering motor 36 and the targeted steering angular velocity θd* of the steering handle 32 is positioned on a straight line L1 in FIG. 4, the required voltage Vr of the steering motor 36 is 14V equal to the normal operation time minimum voltage Vmind. Further, when the required output Opra is positioned on a straight line L2 in FIG. 4, the required voltage Vr of the steering motor 36 is 12V equal to the stop time minimum voltage Vmins. Further, when the required output Opra, is positioned on a straight line L3 in FIG. 4, the required voltage Vr of the steering motor 36 is 8V equal to the restarting time minimum voltage Vminrs.

A straight broken line La of the graph showing the required torque Trq in FIG. 3 represents the maximum value of the torque that the steering motor 36 can generate when the voltage of the battery 14 is 14V. Similarly, a straight broken line Lb represents the maximum value of the torque that the steering motor 36 can generate when the voltage of the battery 14 is 12V. Similarly, a straight broken line Lc represents the maximum value of the torque that the steering motor 36 can generate when the voltage of the battery 14 is 8V.

For example, when the required voltage Vr calculated by applying the required torque Trq of the steering motor 36 and the target steering angular speed θd* to the required voltage calculation map is equal to or less than 14V under the state where the engine 11 is in the normal operation state (that is, under the state where the, voltage of the battery 14 is equal to or higher than the normal operation time minimum voltage Vmind), the steering control ECU 55 can apply a voltage equal to or higher than the required voltage Vr to the steering motor 36. In other words, when the required torque Trq is positioned on the straight broken line La or below the straight broken line La in FIG. 3 under the state where the engine 11 is in the normal operation state, the steering control ECU 55 can rotate the steering motor 36 at the targeted steering angular velocity θd*. In other words, the steering motor 36 can generate the required output Opra. That is, in this case, the vehicle 10 can travel along the targeted vehicular swept path Prp under the automatic driving support control.

On the other hand, for example, when the required voltage Vr of the steering motor 36 is higher than 14V under the state where the engine 11 is in the normal operation state, the steering control ECU 55 may fail to apply a voltage equal to or higher than the required voltage Vr to the steering motor 36. In other words, when the required torque Trq is positioned above the straight broken line La in FIG. 3 under the state where the engine 11 is in the normal operation state, the steering control ECU 55 cannot rotate the steering motor 36 at the targeted steering angular velocity θd*. For example, when the voltage of the battery 14 is the normal operation time minimum voltage Vmind (14V) and the required voltage Vr of the steering motor 36 is higher than 14V, the steering control ECU 55 cannot rotate the steering motor 36 at the targeted steering angular velocity θd*.

In this case, the steering control ECU 55 applies the maximum suppliable voltage (that is, the battery voltage at that time) which is the maximum value of the voltage that the battery 14 can supply to the steering motor 36. However, the maximum suppliable voltage is smaller than the required voltage Vr. Therefore, the steering motor 36 may fail to rotate the steering handle 32 at the targeted steering angular velocity θd* while generating the required torque Trq. That is, in this case, the vehicle 10 fails to travel along the targeted vehicular swept path Prp under the automatic driving support control.

For example, when the voltage, of the battery 14 is 14V and the required voltage Vr is 16 V, the steering control ECU 55 cannot apply a voltage equal to or higher than the required voltage Vr to the steering motor 36. Therefore, in this case, the steering motor 36 fails to rotate the steering handle 32 at the targeted steering angular velocity θd* while generating the required torque Trq. That is, in this case, the vehicle 10 fails to travel along the targeted vehicular swept path Prp under the automatic driving support control.

For example, when the required voltage Vr calculated by applying the required torque Trq of the steering motor 36 and the target steering angular speed θd* to the required voltage calculation map is equal to or less than 12V under the state where the engine 11 is in the operation stopped state (that is, under the state where the voltage of the battery 14 is equal to or higher than the stop time minimum voltage Vmins), the steering control ECU 55 can apply a voltage equal to or higher than the required voltage Vr to the steering motor 36. In other words, when the required torque Trq is positioned on the straight broken line Lb or below the straight broken line Lb in FIG. 3 under the state where the engine 11 is in the operation stopped state, the steering control ECU 55 can rotate the steering motor 36 at the targeted steering angular velocity θd*. In other words, the steering motor 36 can generate the required output Opra. That is, in this case, the vehicle 10 can travel along the targeted vehicular swept path Prp under the automatic driving support control.

On the other hand, for example, when the required voltage Vr of the steering motor 36 is higher than 12V under the state where the engine 11 is in the operation stopped state, the steering control ECU 55 fails to apply a voltage equal to or higher than the required voltage Vr to the steering motor 36. In other words, when the required torque Trq is positioned above the straight broken line Lb in FIG. 3 under the state where the engine 11 is in the operation stopped state, the steering control ECU 55 cannot rotate the steering motor 36 at the targeted steering angular velocity θd*. For example, when the voltage of the battery 14 is the stop time minimum voltage Vmins (12V) and the required voltage Vr of the steering motor 36 is higher than 12V, the steering control ECU 55 cannot rotate the steering motor 36 at the targeted steering angular velocity θd*.

In this case, the steering control ECU 55 applies the maximum suppliable voltage, which is the maximum value of the voltage that the battery 14 can supply, to the steering motor 36. However, the maximum suppliable voltage is smaller than the required voltage Vr. Therefore, the steering motor 36 fails to rotate the steering handle 32 at the targeted steering angular velocity θd* while generating the required torque Trq. That is, in this case, the vehicle 10 fails to travel along the targeted vehicular swept path Prp under the automatic driving support control.

For example, when the voltage of the battery 14 is 12V and the required voltage Vr is higher than 12V, the steering control ECU 55 cannot apply a voltage equal to or higher than the required voltage Vr to the steering motor 36. Therefore, in this case, the steering motor 36 fails to rotate the steering handle 32 at the targeted steering angular velocity θd* while generating the required torque Trq. That is, in this case, the vehicle 10 fails to travel along the targeted vehicular swept path Prp under the automatic driving support control.

Further, for example, when the required voltage Vr calculated by applying the required torque Trq of the steering motor 36 and the target steering angular speed θd, to the required voltage calculation map is equal to or less than 8V under the state where the engine 11 is being restarted (that is, under the state where the starter motor 12 is being rotated), the steering control ECU 55 can apply a voltage equal to or higher than the required voltage Vr to the steering motor 36. In other words, when the required torque Trq is positioned on the straight broken line Lc or below the straight broken line Lc in FIG. 3 under the state where the engine 11 is being restarted, the steering control ECU 55 can rotate the steering motor 36 at the targeted steering angular velocity θd*. In other words, the steering motor 36 can generate the required output Opra. That is, in this case, the vehicle 10 can travel along the targeted vehicular swept path Prp under the automatic driving support control.

On the other hand, for example, when the required voltage Vr of the steering motor 36 is higher than 8V under the state where the engine 11 is being restarted (that is, under the state where the starter motor 12 is being rotated), the steering control ECU 55 fails to apply a voltage equal to or higher than the required voltage Vr to the steering motor 36. In other words, when the required torque Trq is positioned above the straight broken line Lc in FIG. 3 under the state where the engine 11 is being restarted, the steering control ECU 55 cannot rotate the steering motor 36 at the targeted steering angular velocity θd*. For example, when the voltage of the battery 14 is the restarting time minimum voltage Vminrs (8V) and the required voltage Vr of the steering motor 36 is higher than 8V, the steering control ECU 55 cannot rotate the steering motor 36 at the targeted steering angular velocity θd*.

In this case, the steering control ECU 55 makes the battery 14 apply the maximum suppliable voltage to the steering motor 36. However, the maximum suppliable voltage is smaller than the required voltage Vr. Therefore, the steering motor 36 fails to rotate the steering handle 32 at the targeted steering angular velocity θd* while generating the required torque Trq. That is, in this case, the vehicle 10 fails to travel along the targeted vehicular swept path Prp under the automatic driving support control.

When the vehicle 10 is in the automatic driving support mode, there is a possibility that the attention of the driver to the steering handle 32 is reduced as compared with the case where the vehicle 10 is not in the automatic driving support mode. When the vehicle 10 does not travel along the targeted vehicular swept path Prp with the attention of the driver to the steering wheel 32 reduced, the driver may feel a strong discomfort.

Therefore, in the present embodiment, when the vehicle 10 is in the automatic driving support mode, the required voltage monitoring ECU 56 determines whether to allow the engine control ECU 51 to exert the SS control based on the required voltage Vr of the steering motor 36 and the state of the engine 11.

That is, the required voltage monitoring ECU 56 compares the stop time minimum voltage Vmins or the restarting time minimum voltage Vminrs, each of which is the minimum voltage of the battery 14 determined by the state of the engine 11, with the required voltage Vr. In other words, the required voltage monitoring ECU 56 substantially compares the maximum values (straight broken lines Lb, Lc) of the torque, which the steering motor 36 can generate when each minimum voltage is supplied to the steering motor 36, with the required torque Trq calculated based on the graph of FIG. 4.

For example, under the state where the engine 11 is in the normal operation state, when the required voltage Vr at the current time becomes equal to or less than 12V, the required voltage monitoring ECU 56 sets a stop permission flag to "1". In other words, when the required torque Trq is positioned on the straight broken line Lb or below the straight broken line Lb in FIG. 3, the required voltage monitoring ECU 56 sets the stop permission flag to "1".

On the other hand, under the state where the engine 11 is in the normal operation state, when the required voltage Vr at the current time becomes higher than 12V, the required voltage monitoring ECU 56 sets the stop permission flag to "0". In other words, when the required torque Trq is positioned above the straight broken line Lb in FIG. 3, the required voltage monitoring ECU 56 sets the stop permission flag to "0". The initial value of the stop permission flag is "0".

Then, when the stopping condition is satisfied at the current time, the engine control ECU 51 determines whether to stop the engine 11 based on the value of the stop permission flag which is set by the required voltage monitoring ECU 56 at the current time. That is, when the stopping condition is satisfied at the current time and the stop permission flag is "1" at the current time, the engine control ECU 51 stops the engine 11 under the SS control. On the other hand, when the stop permission flag is "0" at the current time, the engine control ECU 51 does not stop the engine 11 under the SS control. Namely, in this case, even when the stopping condition is satisfied at the current time, the engine control ECU 51 does not stop the engine 11 under the SS control.

For example, the stopping condition is satisfied at time t1 in FIG. 3. However, the required voltage Vr at this time is larger than the stop time minimum voltage Vmins (12V) of the battery 14. In other words, in FIG. 3, the required torque Trq is positioned above the straight broken line Lb. Therefore, the stop permission flag is "0" at this time. Therefore, at time t1, the engine control ECU 51 does not stop the engine 11.

On the other hand, the stopping condition is satisfied at time t2 in FIG. 3. Further, the required voltage Vr at this time is equal to or less than the stop time minimum voltage Vmins (12V) of the battery 14. In other words, in FIG. 3, the required torque Trq is positioned below the straight broken line Lb. Therefore, the stop permission flag is "1" at this time. Therefore, at time t2, the engine control ECU 51 stops the engine 11.

However, even when the automatic driving support mode is selected by operating the automatic driving support mode selection switch 60, the engine control ECU 51 may stop the engine 11 immediately when the stopping condition is satisfied regardless of the value of the stop permission flag. This occurs when a predetermined exceptional condition is satisfied.

For example, when the driver operates the direction indicator operating lever 21 to transmit an operation signal of the direction indicator operating lever 21 to the engine control ECU 51 from vehicle control ECU 52, the engine control ECU 51 determines that the exceptional condition is satisfied.

For example, when the vehicle 10 is positioned at the position shown in FIG. 2, the driver intentionally rotates the steering handle 32 in the clockwise direction while blinking the direction indicator 22R. Then, the vehicle 10 crosses the travel lane 72 and enters the travel lane 81 of the road 80.

In this way, when the driver steers the steering wheel 32 by his own intention, the steering control ECU 55 calculates the target steering assist torque based on the steering torque Tr detected by the steering torque sensor 35 and the vehicle speed V. Further, the steering control ECU 55 controls the steering motor 36 so as to generate the target steering assist torque.

In this case, the required voltage Vr of the steering motor 36, which corresponds to the target steering assist torque, may become larger than the stop time minimum voltage Vmins of the battery 14. However, in the case where the driver steers the steering wheel 32 by his own intention, even if the steering motor 36 cannot generate a desired output, the driver is unlikely to feel a strong discomfort. Therefore, when the stopping condition is satisfied in this case, the engine control ECU 51 immediately stops the engine 11 regardless of the value of the stop permission flag.

When the required voltage Vr at the time at which the required time for starting Trs passes from the current time becomes equal to or less than 8V under the state where the engine 11 is in the operation stopped state, the required voltage monitoring ECU 56 sets a restart permission flag to "1" at the current time. In other words, when the required torque Trq is positioned on the straight broken line Lc or below the straight broken line Lc in FIG. 3 at the time at which the required time for starting Trs passes, the required voltage monitoring ECU 56 sets the restart permission flag to "1".

On the other hand, when the required voltage Vr at the time at which the required time for starting Trs passes from the current time becomes larger than 8V under the state where the engine 11 is in the operation stepped state, the required voltage monitoring ECU 56 sets the restart permission flag to "0" at the current time. In other words, when the required torque Trq is positioned above the straight broken line Lc in FIG. 3 at the time at which the required time for starting Trs passes, the required voltage monitoring ECU 56 sets the restart permission flag to "0". The initial value of the restart permission flag is "0".

When the restart condition is satisfied, the engine control ECU 51 determines whether to restart the engine 11 based on the value of the restart permission flag set by the required voltage monitoring ECU 56. That is, when the restart condition is satisfied at the current time and the restart permission flag is "1" at the current time, the engine control ECU 51 restarts the engine 11 under the SS control. In other words, the engine control ECU 51 supplies the electricity of the battery 14 to the starter motor 12. On the other hand, under the state where the restart condition is satisfied at the current time, when the restart permission flag is "0" at the current time, the engine control ECU 51 does not restart the engine 11 under the SS control. In other words, the engine control ECU 51 does not supply the electricity of the battery 14 to the starter motor 12.

For example, the restart condition is not satisfied in the time period at or after time t2 and before time t3 in FIG. 3, and the restart condition is satisfied at time t3.

Further, the required voltage Vr at time t4 which comes when the required time for starting Trs passes from time t3 is equal to or less than the restarting time minimum voltage Vminrs (8V) of the battery 14. In other words, in FIG. 3, the required torque Trq is positioned below the straight broken line Lc. Therefore, at time t3, the required voltage monitoring ECU 56 sets the restart permission flag to "1". Therefore, at time t3, the engine control ECU 51 restarts the engine 11. That is, the engine control ECU 51 supplies the electricity of the battery 14 to the starter motor 12 at time 13 so that an initial explosion is carried put in the engine 11. In this case, time t4 may be referred to as complete explosion completion time, and the required voltage Vr at time 14 may be referred to as complete explosion time required voltage.

A complete explosion is carried out (completed) before time t4 being the complete explosion completion time comes in the engine 11 in which an initial explosion was carried out (completed) immediately after time t3. That is, the starter motor 12 is in a stopped state at time t4.

The required voltage Vr becomes larger than the restarting time minimum voltage Vminrs (8V) of the battery 14 at time t5 which comes after time t4. In other words, in FIG. 3, the required torque Trq is positioned above the straight broken line Lc. However, since the starter motor 12 is in the stopped state at time t5, the minimum voltage of the battery 14, which is determined by the state of the engine 11, is the normal operation time minimum voltage Vmind (14V) at time t5. Therefore, in this case, the required torque Trq is positioned below the straight broken line La in FIG. 3.

Accordingly, at time t5, a voltage equal to or higher than the required voltage Vr is applied to the steering motor 36.

If the control device 50 is configured to supply the electricity of the battery 14 to the starter motor 12 at time t4 when the restart condition is satisfied at time t4 and the restart permission flag is switched from "0" to "1" at time t4, an initial explosion is carried out in the engine 11 immediately after time t4.

In the case of configuring the control device 50 in this manner, a complete explosion is carried out in the engine 11 at time t6. That is, in the time period between time t4 and time t6, the minimum voltage of the battery 14 is the restarting time minimum voltage Vminrs (8V). In other words, in the time period between time t5 and time t6, the required voltage Vr becomes higher than the restarting time minimum voltage Vminrs. That is, in this time period, the required torque Trq is positioned above the straight broken line Lc in FIG. 3.

Therefore, in this case, voltage equal to or higher than the required voltage Vr is not applied to the steering motor 36 in the time period between time t5 and time t6. That is, in this time period, the vehicle 10 fails to travel along the targeted vehicular swept path Prp tinder the automatic driving support control.

However, even when the automatic driving support mode is selected by operating the automatic driving support mode selection switch 60, the engine control ECU 51 may restart the engine 11 immediately when the restart condition is satisfied regardless of the value of the restart permission flag. This occurs when a predetermined emergency condition is satisfied For example, when the collision avoidance control is exerted, the engine control ECU 51 determines that the emergency condition is satisfied.

For example, when another vehicle (not shown), which is positioned in front of the vehicle 10 and is traveling on the travel lane 72, enters the travel lane 71 in error under the state where the vehicle 10 is carrying out inertia travel on the travel lane 71 with the engine 11 stopped, the vehicle control ECU 52 may exert the automatic steering control.

In this case, the vehicle control ECU 52 may determine that the possibility that the vehicle 10 under the automatic steering control avoids a collision with another vehicle described above when the engine 11 is immediately started becomes higher than when the engine 11 is maintained in the operation stopped state, based on the positional relationship between the vehicle 10 and another vehicle described above and the relative speed therebetween. In this case, the engine control ECU 51 immediately restarts the engine 11 regardless of the value of the restart permission flag.

Next, a specific processing executed by the control device 50 will be described with reference to the flowcharts of FIGS. 5 to 9.

Figure 5:
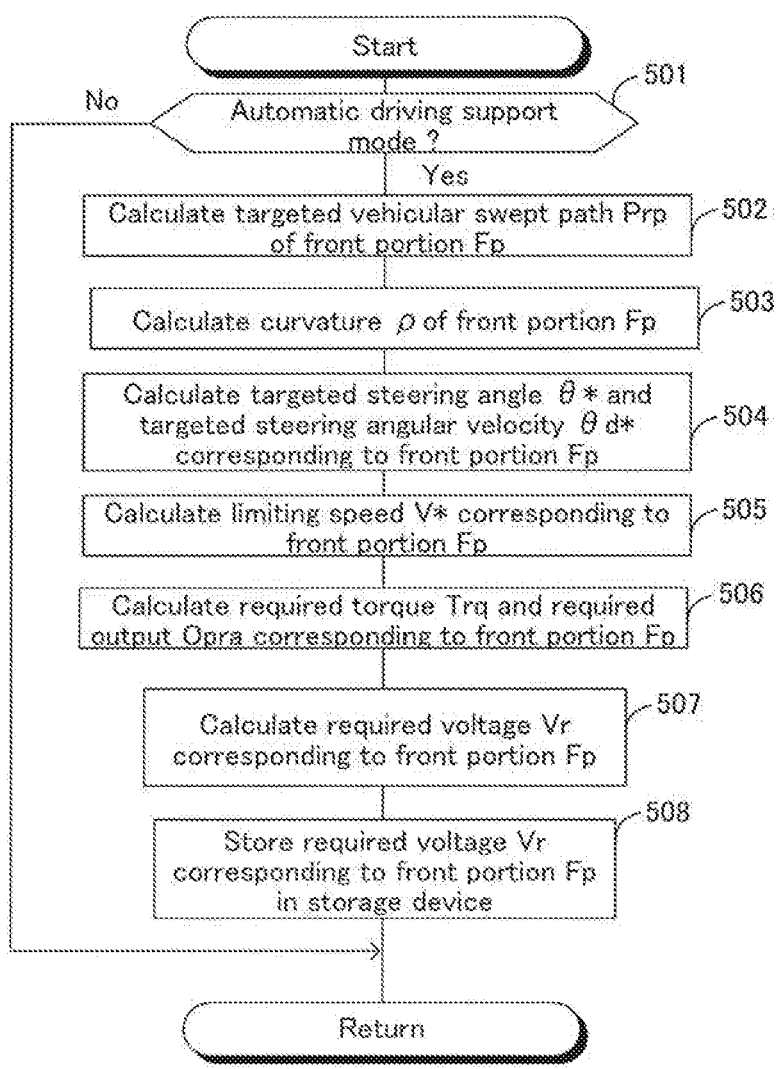
FIG. 5 is a flowchart showing a processing executed by a steering control ECU.

When an ignition switch of the vehicle 10 is switched from OFF to ON by an operation of an ignition key, the steering control ECU 55 repeatedly executes the routine shown in the flowchart of FIG. 5 every time the calculation interval time Tc (for example 1 second) passes. In the present embodiment, the calculation interval time Tc is set to ⅕ of the required time for starting Trs. For example, the calculation interval time Tc may be set to 1 second and the required time for starting Trs may be set to 5 seconds.

First, in step 501, the steering control ECU 55 determines whether or not the automatic driving support mode is selected by the automatic driving support mode selection switch 60.

When determining Yes in step 501, the steering control ECU 55 proceeds to step 502. When the automatic driving support mode is selected, the control device 50 constantly supplies the electricity of the battery 14 to the steering motor 36. That is, the battery 14 applies the maximum suppliable voltage to the steering motor 36.

When proceeding to step 502, the steering control ECU 55 calculates the targeted vehicular swept path Prp of the front portion Fp of the road 70 based on imaged data which includes the white line 70A and the white line 70B and is received from the camera control ECU 54.

The steering control ECU 55 that has finished the processing of step 602 proceeds to step 503 to calculate the curvature ρ of the front portion Fp based on the targeted vehicular swept path Prp.

The steering control ECU 55 that has finished the processing of step 503 proceeds to step 504 to calculate the targeted steering angle θ* and the targeted steering angular velocity θd* both of which correspond to the front portion Fp based on the curvature ρ of the front portion Fp. In other words, the steering control ECU 55 calculates the targeted steering angle θ* the required time for starting Trs later and the targeted steering angular velocity θd* the required time for starting Trs later.

The steering control ECU 55 that has finished the processing of step 504 proceeds to step 505 to calculate the limiting speed V* corresponding to the front portion Fp based on the targeted steering angle θ* and the limit value of the lateral acceleration. In other words, the steering control ECU 55 calculates the limiting speed V* the required time for starting Trs later.

The steering control ECU 55 that has finished the processing of step 505 proceeds to step 506 to calculate the required torque Trq (output torque) of the steering motor 36 which corresponds to the front portion Fp based on the targeted steering angle θ* and the limiting speed V*. In other words, the steering control ECU 55 calculates the required torque Trq the required time for starting Trs later.

Further, the steering control ECU 55 calculates the required output Opra of the steering motor 36 which corresponds to the front portion Fp based on the required torque Trq and the target steering angular speed θd*. In other words, the steering control ECU 55 calculates the required output Opra the required time for starting Trs later.

The steering control ECU 55 that has finished the processing of step 506 proceeds to step 507 to calculate the required voltage Vr of the steering motor 36 which corresponds to the front portion Fp based on the required output Opra. In other words, the steering control ECU 55 calculates the required voltage Vr the required time for starting Trs later.

The steering control ECU 55 that has finished the processing of step 507 proceeds to step 508 to record the required voltage Vr corresponding to the front portion Fp in the storage device thereof.

The steering control ECU 55 that has finished the processing of step 508 temporarily ends the processing of this routine.

When the steering control ECU 55 determines No in step 501, the steering control ECU 55 temporarily ends the processing of this routine.

Figure 6:
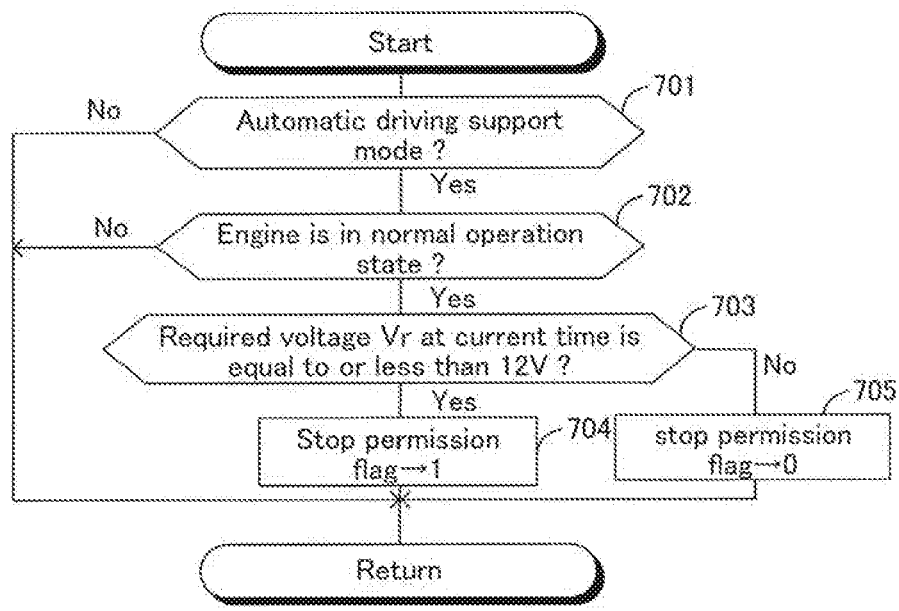
FIG. 6 is a flowchart showing a processing executed by a required voltage monitoring ECU.

When the ignition switch of the vehicle 10 is switched from OFF to ON by the operation of the ignition key, the required voltage monitoring ECU 56 repeatedly executes the routine shown in the flowchart of FIG. 6 every time the calculation interval time Tc passes.

First, in step 701, the required voltage monitoring ECU 66 determines whether or not the automatic driving support mode is selected by the automatic driving support mode selection switch 60.

When determining Yes in step 701, the steering control ECU 55 proceeds to step 702.

In step 702, the required voltage monitoring ECU 56 determines whether or not the engine 11 is in the normal operation state.

The required voltage monitoring ECU 58 that has determined Yes in step 702 proceeds to step 703 to determine whether or not the required voltage Vr at the current time is equal to or less than the stop time minimum voltage Vmins (12V).

The required voltage monitoring ECU 56 that has determined Yes in step 703 proceeds to step 704 to set the stop permission flag to "1".

On the other hand, the required voltage monitoring ECU 56 that has determined No in step 703 proceeds to step 705 to set the stop permission flag to "0".

After finishing the processing of step 704 or step 705, the required voltage monitoring ECU 56 temporarily ends the processing of this routine.

When determining No in step 701 or 702, the required voltage monitoring ECU 56 temporarily ends the processing of this routine.

Figure 7:
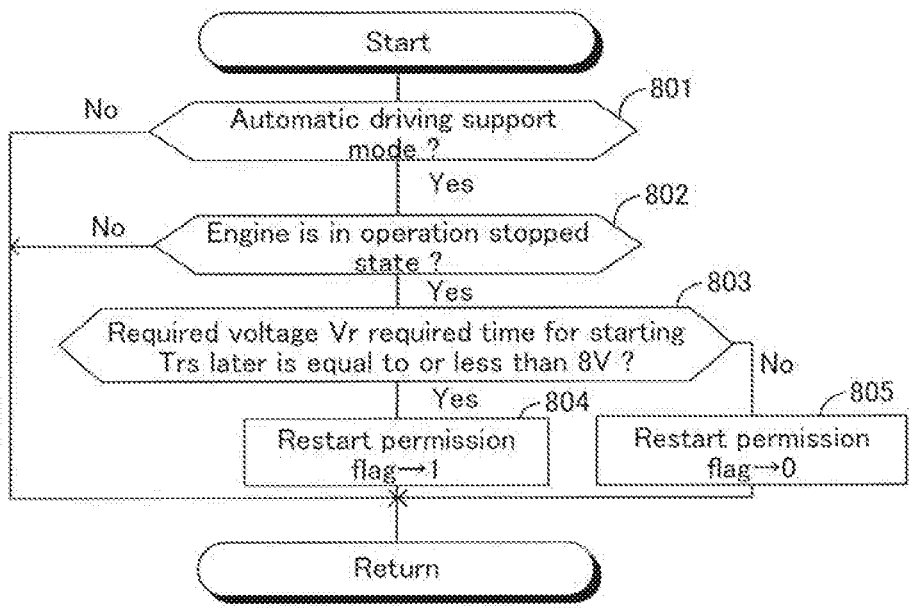
FIG. 7 is a flowchart showing a processing executed by the required voltage monitoring ECU.

When the ignition switch of the vehicle 10 is switched from OFF to ON by the operation of the ignition key, the required voltage monitoring ECU 58 repeatedly executes the routine shown in the flowchart of FIG. 7 every time the calculation interval time Tc passes.

First, in step 801, the required voltage monitoring ECU 56 determines whether or not the automatic driving support mode is selected by the automatic driving support mode selection switch 60.

When determining Yes in step 801, the steering control ECU 55 proceeds to step 802.

In step 802, the required voltage monitoring ECU 56 determines whether or not the engine 11 is in the operation stopped state.

The required voltage monitoring ECU 56 that has determined Yes in step 802 proceeds to step 803 to determine whether or not the required voltage Vr the required time for starting Trs later is equal to or less than the restarting time minimum voltage Vminrs (8V).

The required voltage monitoring ECU 56 that has determined Yes in step 803 proceeds to step 804 to set the restart permission flag to "1".

On the other hand, the required voltage monitoring ECU 56 that has determined No in step 803 proceeds to step 805 to set the restart permission flag to "0".

After finishing the processing of step 804 or step 805, the required voltage monitoring ECU 56 temporarily ends the processing of this routine.

When determining No in step 801 or 802, the required voltage monitoring ECU 56 temporarily ends the processing of this routine.

Figure 8:
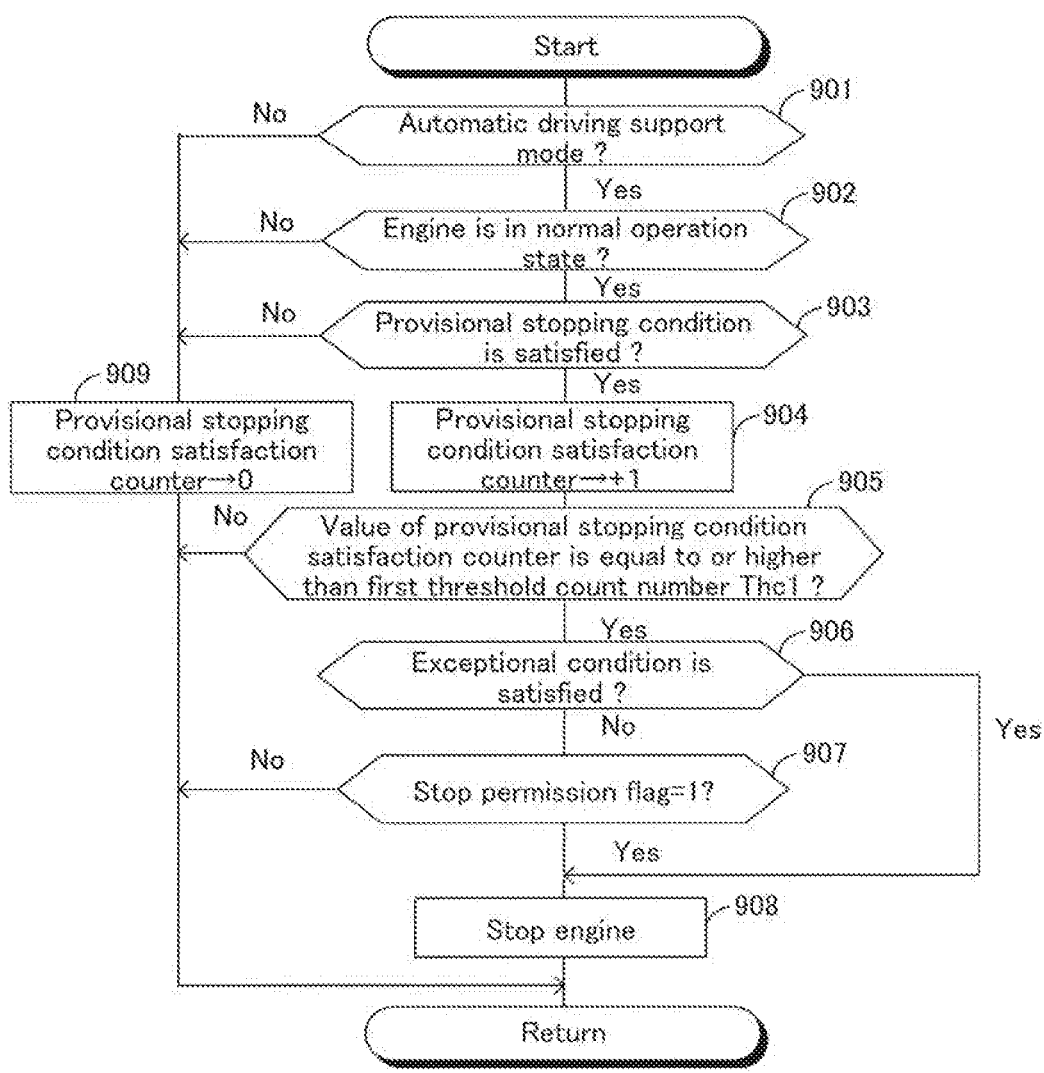
FIG. 8 is a flowchart showing a processing executed by an engine control ECU.

When the ignition switch of the vehicle 10 is switched from OFF to ON by the operation of the ignition key, the engine control ECU 51 repeatedly executes the routine shown in the flowchart of FIG. 8 every time the calculation interval time Tc passes.

First, in step 901, the engine control ECU 51 determines whether or not the automatic driving support mode is selected toy the automatic driving support mode selection switch 60.

When determining Yes in step 901, the engine control ECU 51 proceeds to step 902.

In step 902, the engine control ECU 51 determines whether or not the engine 11 is in the normal operation state.

The engine control ECU 51 that has determined Yes in step 902 proceeds to step 903 to determine whether or not a provisional stopping condition is satisfied.

The provisional stopping condition is satisfied, for example, when the vehicle speed V of the vehicle 10 is equal to or less than the predetermined speed (for example, 10 km/h or less) and the operation amount AP of the accelerator pedal A/P is zero.

The engine control ECU 51 that has determined Yes in step 903 proceeds to step 904 to add "1" to the value of a provisional stopping condition satisfaction counter.

On the other hand, the engine control ECU 51 that has determined No in step 903 proceeds to step 909 to set the value of the provisional stopping condition satisfaction counter to "0".

The engine control ECU 51 that has finished the processing of step 904 proceeds to step 905 to determine whether or not the value of the provisional stopping condition satisfaction counter is equal to or larger than a predetermined first threshold count number Thc1.

The first threshold count number Thc1 is stored in the storage device of the engine control ECU 51.

The first, threshold count number Thc1 can be, for example, "3".

When the engine control ECU 51 determine Yes in step 905, the stopping condition is satisfied.

When the stopping condition is satisfied, the engine control ECU 51 proceeds to step 906 to determine whether or not the exceptional condition is satisfied.

When determining No in step 906, the engine control ECU 51 proceeds to step 907 to determine whether or not the stop permission flag is "1".

The engine control ECU 51 that has determined Yes in step 907 proceeds to step 908 to stop the engine 11. That is, the engine control ECU 51 stops the engine 11 under the SS control.

On the other hand, when the engine control ECU 51 determines Yes in step 906, the engine control ECU 51 proceeds to step 908 to stop the engine 11. That is, regardless of the value of the stop permission flag, the engine control ECU 51 stops the engine 11 under the SS control.

The engine control ECU 51 that has finished the processing of step 908 or step 909 temporarily ends the processing of this routine.

Figure 9:
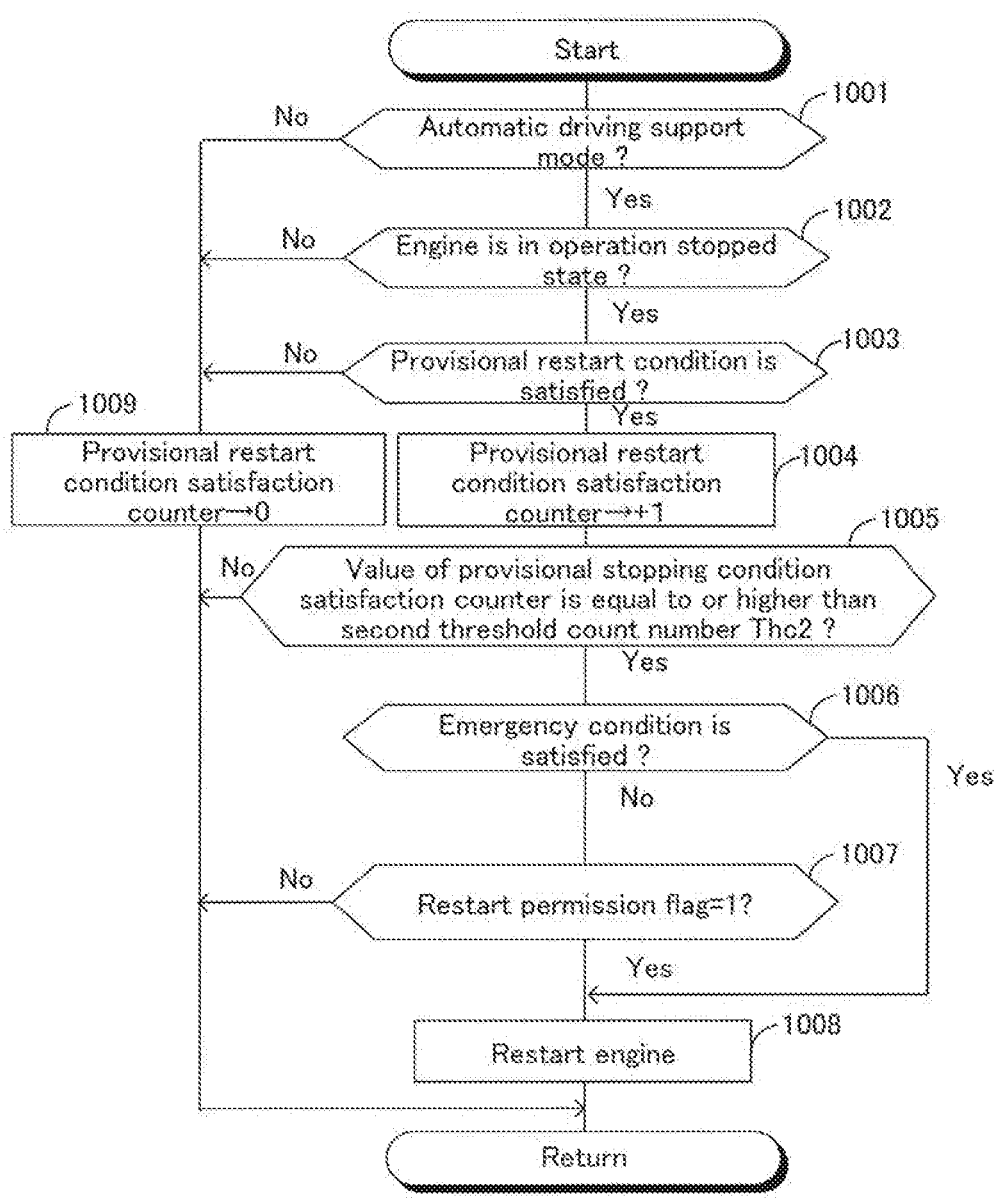
FIG. 9 is a flowchart showing a processing executed by the engine control ECU.

When the ignition switch of the vehicle 10 is switched from OFF to ON by the operation of the ignition key, the engine control ECU 51 repeatedly executes the routine shown in the flowchart of FIG. 9 every time the calculation interval time Tc passes.

First, in step 1001, the engine control ECU 51 determines whether or not the automatic driving support mode is selected by the automatic driving support mode selection switch 60.

When determining Yes in step 1001, the engine control ECU 51 proceeds to step 1002.

In step 1002, the engine control ECU 51 determines whether or not the engine 11 is in the operation stopped state.

The engine control ECU 51 that has determined Yes in step 1002 proceeds to step 1003 to determine whether or not a provisional restart condition is satisfied.

The provisional restart condition is satisfied, for example, when the operation amount AP of the accelerator pedal A/P is larger than zero.

The engine control ECU 51 that has determined Yes in step 1003 proceeds to step 1004 to add "1" to the value of a provisional restart condition satisfaction counter.

On the other hand, the engine control ECU 51 that has determined No in step 1003 proceeds to step 1009 to set the value of the provisional restart condition satisfaction counter to "0".

The engine control ECU 51 that has finished the processing of step 1004 proceeds to step 1005 to determine whether or not the value of the provisional restart condition satisfaction counter is equal to or larger than a predetermined second threshold count number Thc2.

The second threshold count number Thc2 is stored in the storage device of the engine control ECU 51.

The second threshold count number Thc2 can be, for example, "3".

When the engine control ECU 51 determine Yes in step 1005, the restart condition is satisfied.

When the restart condition is satisfied, the engine control ECU 51 proceeds to step 1006 to determine whether or not the emergency condition is satisfied.

When the engine control ECU 51 determines No in step 1006, the engine control ECU 51 proceeds to step 1007 to determine: whether or not the restart permission flag "1".

The engine control ECU 51 that has determined Yes in step 1007 proceeds to step 1008 to restart the engine 11. That is, the engine control ECU 51 operates the engine 11 under the SS control so that an initial explosion is carried out.

On the other hand, when determining Yes in step 1006, the engine control ECU 51 proceeds to step 1008 to restart the engine 11. That is, regardless of the value of the restart permission flag, the engine control ECU 51 restarts the engine 11 under the SS control.

The engine control ECU 51 that has finished the processing of step 1008 or step 1009 temporarily ends the processing of this routine.

It should be noted that the present invention is not limited to the above embodiment, and various modified embodiments can be adopted within the scope of the present invention.

Figure 10:
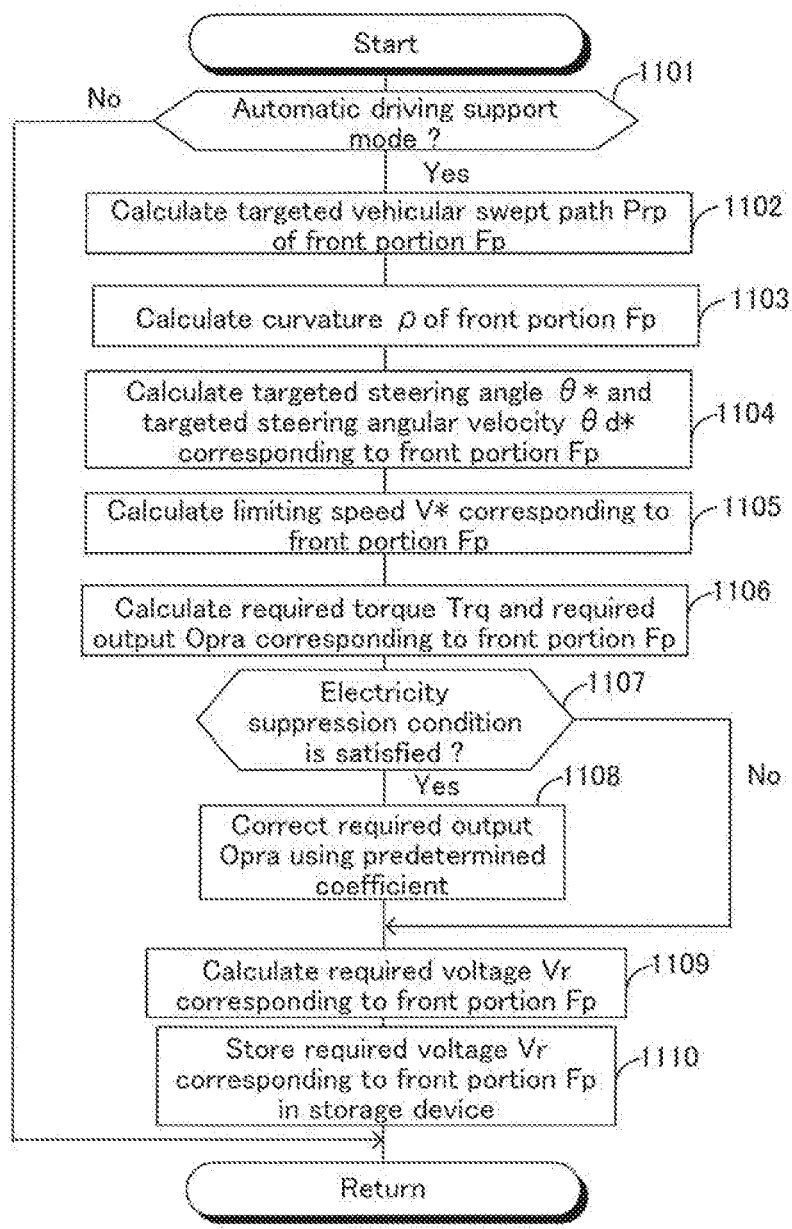
FIG. 10 is a flowchart of a first modified embodiment of the present invention corresponding to FIG. 5.

For example, the present, invention may be executed in a manner of a first modified embodiment shown in FIG. 10.

In the first modified embodiment, when a predetermined electricity suppression condition is satisfied, the steering control ECU 55 calculates the required voltage Vr corresponding to the front portion Fp using a procedure different from the above embodiment. In other words, the required voltage Vr the required time for starting Trs later is calculated by the steering control ECU 55 using the procedure different from the above embodiment.

For example, when an ECO mode selection switch (not shown) provided in the vehicle 10 is switched from an OFF position to an ON position by an occupant of the vehicle 10, the electricity suppression condition is satisfied.

In the first modified embodiment, when the ignition switch of the vehicle 10 is switched from OFF to ON by an operation of the ignition key, the steering control ECU 55 repeatedly executes the routine shown in the flowchart of FIG. 10 every time the calculation interval time Tc passes.

Processing of each of steps 1101 to 1108 of this flowchart is the same as that of each of the steps 501 to 508 of FIG. 5, respectively. Further, processing of each of steps 1109 and 1110 is the same as that of each of steps 507 and 508 in FIG. 5, respectively.

The steering control ECU 55 that has finished the processing of step 1108 proceeds to step 1107 to determine whether or not the electricity suppression condition is satisfied.

The steering control ECU 55 that has determined No in step 1107 proceeds to step 1109 and further proceeds to step 1110. That is, in this case, the steering control ECU 55 executes the same processing as the steps 307 and 508 in the flowchart of FIG. 5.

On the other hand, the steering control ECU 55 that has determined Yes in step 1107 proceeds to step 1108 to correct the value of the required output Opra corresponding to the front portion Fp which was calculated in step 1106. More specifically, the steering control ECU 55 multiplies the required output Opra calculated in step 1106 by a predetermined coefficient.

This coefficient is smaller than 1 and larger than 0. For example, 0.7 can be used as this coefficient.

The steering control ECU 55 that has finished the processing of step 1108 proceeds to step 1109 to calculate the required voltage Vr corresponding to the corrected required output Opra.

This required voltage Vr is smaller than the required voltage Vr when the steering control ECU 55 proceeds to step 1109 after determining No in step 1107.

Therefore, in this case, when the required voltage Vr recorded in step 1110 is applied to the steering motor 36 at the time at which the required time for starting Trs passes, the steering motor 36 is operated with less electricity than when the steering control ECU 55 determines No in step 1107.

However, in this case, when the vehicle 10 passes through the front portion Fp at the time at which the required time for starting Trs passes, the actual vehicular swept path Pf of the vehicle 10 is slightly deviated from the targeted vehicular swept path Prp as shown in FIG. 2.

The vehicle 10 may be configured so that at least one of the normal operation time minimum voltage Vmind, the stop time minimum voltage Vmins, and the restarting time minimum voltage Vminrs has a value different from the corresponding one of the minimum voltages in the embodiment and the modified embodiment. For example, the vehicle 10 may be configured so that the restarting time minimum voltage Vminrs is 9V.

In the embodiment and the modified embodiment, the steering motor 36 may be a three-phase brushless motor.

What is claimed is:

1. A vehicle control device comprising:
   an internal combustion engine installed in a vehicle;
   a power generating means for generating electricity using power of the internal combustion engine;
   a battery for storing the electricity generated by the power generating means;
   an electric starter motor configured to rotate to start the internal combustion engine when being supplied the electricity from the battery;
   an electric power steering apparatus having an electric steering motor configured to rotate to change steered angles of steered wheels of the vehicle when being supplied the electricity from the battery; and
   a control unit configured:
      to apply a voltage to the steering motor using the electricity of the battery to rotate the steering motor;
      to stop an operation of the internal combustion engine that is in the operation state when a predetermined stopping condition is satisfied; and
      to rotate the starter motor to restart the internal combustion engine that is in an operation stopped state when a predetermined restart condition is satisfied,
   wherein,
   the control unit is configured to:
      calculate a required voltage that is a voltage required for rotating the steering motor so as to generate a predetermined output;
      be allowed to stop the internal combustion engine when the required voltage is smaller than or equal to a first voltage value under a state where the stopping condition is satisfied;
      be prohibited from stopping the internal combustion engine when the required voltage is larger than the first voltage value under the state where the stopping condition is satisfied;
      be allowed to restart the internal combustion engine when the required voltage is smaller than or equal to a second voltage value that is smaller than the first voltage value under a state where the restart condition is satisfied; and
      be prohibited from restarting the internal combustion engine when the required voltage is larger than the second voltage value under the state where the restart condition is satisfied.

2. The vehicle control device according to claim 1, wherein, the control unit is configured to:
   calculate a targeted vehicular swept path that is a vehicular swept path of the vehicle when a predetermined period of time passes; and
   calculate the required voltage when the predetermined period of time passes so that the vehicle travels along the targeted vehicular swept path.

3. The vehicle control device according to claim 2, wherein, the control unit is configured to:
   calculate a complete explosion time required voltage that is the required voltage at a complete explosion completion time, wherein the complete explosion completion time is a time at which a complete explosion is expected to be completed in the internal combustion engine in a case where the starter motor is started at a predetermined time, and the complete explosion completion time is a time at which a predetermined required time for starting passes since the predetermined time; and
   start the starter motor at the predetermined time when the complete explosion time required voltage is smaller than or equal to the second voltage value.

4. The vehicle control device according to claim 1, wherein, the control unit is configured to:
   calculate a complete explosion time required voltage that is the required voltage at a complete explosion completion time, wherein the complete explosion completion time is a time at which a complete explosion is expected to be completed in the internal combustion engine in a case where the starter motor is started at a predetermined time, and the complete explosion completion time is a time at which a predetermined required time for starting passes since the predetermined time; and
   start the starter motor at the predetermined time when the complete explosion time required voltage is smaller than or equal to the second voltage value.

5. The vehicle control device according to claim 1, wherein,
   the control unit is configured to calculate the required voltage when a predetermined electricity suppression condition is satisfied so that the required voltage when the predetermined electricity suppression condition is satisfied is smaller than the required voltage which is calculated when the predetermined electricity suppression condition is not satisfied.

* * * * *